(12) United States Patent
Bonhomme et al.

(10) Patent No.: US 7,607,531 B2
(45) Date of Patent: Oct. 27, 2009

(54) DEVICE FOR ADJUSTING TRACKS ON A CONVEYOR

(75) Inventors: Eric Bonhomme, Octeville-sur-Mer (FR); Vincent Rodot, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 12/159,320

(22) PCT Filed: Dec. 22, 2006

(86) PCT No.: PCT/FR2006/002834

§ 371 (c)(1),
(2), (4) Date: Jun. 26, 2008

(87) PCT Pub. No.: WO2007/074230

PCT Pub. Date: Jul. 5, 2007

(65) Prior Publication Data
US 2009/0000914 A1 Jan. 1, 2009

(30) Foreign Application Priority Data
Dec. 27, 2005 (FR) .................................. 05 13342

(51) Int. Cl.
B65G 47/26 (2006.01)

(52) U.S. Cl. .................... 198/452; 198/442; 198/836.3

(58) Field of Classification Search ................. 198/442, 198/452, 445, 836.3, 456, 426; 53/497, 247, 53/248, 260, 255
See application file for complete search history.

(56) References Cited

U.S. PATENT DOCUMENTS

| | | | | | |
|---|---|---|---|---|---|
| 2,951,574 | A | * | 9/1960 | Craig | 198/836.3 |
| 3,767,027 | A | * | 10/1973 | Pund et al. | 198/452 |
| 4,432,189 | A | * | 2/1984 | Raudat | 53/497 |
| 5,411,129 | A | * | 5/1995 | Crouch | 198/442 |
| 6,209,707 | B1 | * | 4/2001 | Ronchi | 198/445 |
| 7,207,428 | B2 | * | 4/2007 | Huttner | 198/444 |
| 2005/0217974 | A1 | * | 10/2005 | Huttner | 198/442 |

* cited by examiner

Primary Examiner—James R Bidwell
(74) Attorney, Agent, or Firm—Sughrue Mion, PLLC

(57) ABSTRACT

The invention relates to a device for adjustment of tracks, comprising a mechanism for moving the walls in order to simultaneously adjust the width of different tracks. The device also comprises a system for transverse displacement of the tracks with relation to the medial longitudinal axis of said conveyor. The system comprise a carriage arranged between the support structure for the walls and the mechanism for moving the walls, the carriage being transversely movable and guided by a system of slides arranged at the level of each support structure in order to carry out said transverse displacement of the set of tracks without altering the width thereof. The above arrangement permits the guiding as necessary of lines of bottles or other things, the number of which can vary going from an even number to an odd number.

10 Claims, 4 Drawing Sheets

DEVICE FOR ADJUSTING TRACKS ON A CONVEYOR

CROSS REFERENCE TO RELATED APPLICATION

This application is a National Stage of International Application No. PCT/FR2006/002834 filed on Dec. 22, 2006, claiming priority based on French Patent Application No. 05 13342, filed Dec. 27, 2005, the contents of all of which are incorporated herein by reference in their entirety.

The present invention relates to a device for adjusting lanes arranged across a conveyor for guiding objects such as bottles for example.

These lanes are found in any application that requires products or objects to arrive along several tracks. Thus, for example, these lanes are used on machines for boxing and/or palletizing objects of the bottle kind. They allow these bottles to be positioned precisely, in several rows, so that they can be picked up for example using an appropriate handling tool.

To make these machines multipurpose it is advantageous to be able to alter the width of the lanes so as to adapt it to the various formats of objects and particularly bottles to be boxed and/or palletized.

Document EP 1507722 describes a device that allows the width of the lanes on a conveyor carrying bottles, cans or the like to be adjusted at will and simultaneously.

The present invention proposes an improvement to this type of installation that improves its universal nature.

The device for adjusting the lanes, according to the invention, comprises
- on the one hand, as described in the aforementioned document, a mechanism for moving the walls which delimit the various lanes, which mechanism consists of a coordinated drive system which acts on said walls to adjust the width of said lanes simultaneously, which walls are guided on transverse slides which are secured to bearing structures integral with said conveyor,
- and, on the other hand, means for shifting said lanes transversely with respect to the median longitudinal axis of said conveyor, which means consist, at each bearing structure that bears the various walls, of a carriage-like support which is inserted between said bearing structure and said coordinated drive system for driving said walls, which carriage can move under the effect of appropriate means in order to shift all of said lanes transversely without modifying their width, so as to be able to guide, as required, lines of bottles or the like, the number of which may vary, switching from an even number to an odd number.

In addition to improving the universal nature of such an installation, the position of the lanes can be adjusted transversely very quickly and easily using a centralized control.

According to another provision of the invention, the device for adjusting the transverse position of the lanes comprises a mechanism for simultaneously moving the various carriages which are positioned level with each of the bearing structures, which movement mechanism comprises connecting means, in the form of shafts, connecting said carriages together so that the transverse position of all the lanes can be adjusted in a centralized manner with respect to the median axis of symmetry of the conveyor.

Again according to the invention, the mechanism for moving each carriage consists of a rack positioned on said carriage and of a pinion driven by a control member, which member acts on each carriage via a system of shafts, which shafts are positioned laterally in such a way that they do not impede operator access to the lanes for example in the event of an incident befalling one of said lanes.

According to another provision of the invention, the drive system for driving the walls, that allows the width of the lanes to be adjusted, comprises an endless belt or chain stretched between two wrap-around wheels, which are mounted on the carriage, which chain is driven by appropriate means positioned directly on said carriage and its two strands are parallel to the system of slides that guide said walls, which strands of said chain are each secured to one of said walls, which walls, which are driven by said chain, termed master walls, drive the other walls by means of a system for coordinating the separation between these walls.

Again according to the invention, the system for coordinating the separation of the various walls comprises:
- a lever articulated to one of said walls, and
- mutually parallel link rods inserted between said lever and each of the other walls; said link rods form, with said lever, two of the sides of homothetic triangular shapes and are positioned in one and the same plane which is vertical, perpendicular to the longitudinal axis of the conveyor.

This adjusting device allows the position and width of the lanes to be altered at will very simply and, above all, ergonomically, without any effort in terms of the moving of the movable walls that make up these lanes.

This device also has the advantage of guaranteeing a high degree of accuracy in the adjusting of each lane and, in general, of allowing the installation to operate entirely safely without any risk of error.

According to another provision of the invention, each bearing structure that bears the walls comprises a box structure to house all the mechanisms for guiding and moving said walls, which box structure is associated with uprights positioned laterally on the conveyor and it forms, with said uprights, a kind of portal frame situated over the conveyor, which portal frames are positioned on each side of the handover station and an additional portal frame is positioned upstream at the entrance to the lanes.

Again according to the invention, each carriage is guided along a rim of the box structure of the bearing structure, which guidance is by way of horizontal slots formed in said rim and of sliders secured to said carriage.

According to another provision of the invention, the adjusting mechanism comprises two systems of shafts:
- the system of shafts for moving the carriages transversely, and—a system of shafts for moving the walls, which systems of shafts respectively comprise a master shaft which extends between the two upstream portal frames and a driven shaft, connected to said corresponding master shaft by means of a chain, of the endless type, said shafts in general being positioned laterally and somewhere that does not impede operator access to the lanes.

Again according to the invention, each wall consists of two portions hinged together:
- a downstream portion positioned level with the handover station, and—an upstream portion hinged to said downstream portion about a vertical axis so as to form, with said adjacent upstream portions, a kind of mouth or funnel, which upstream portions are handled, at their upstream end, by the drive system for driving said walls, which drive system for driving said upstream portions is out of phase with the other drive systems for driving said downstream portions through having been set up differently from the outset so that a wider spacing is applied to the entrance to said upstream portions.

According to another provision of the invention, the system for coordinating the adjusting of the width of the walls comprises means for quickly altering the position of one side wall and retracting it, which means are positioned level with the end of the corresponding link rod and, in particular, on the lever, which lever comprises a push-button which engages with notches formed on said link rod, the latter further comprising an end stop that makes it possible easily to revert to the initial set-up.

The invention will be further detailed with the aid of the following description and of the attached drawings which are given by way of indication and in which:

FIG. 10 depicts details of the attachment of a link rod to the operating lever.

FIG. 1 depicts a system of lanes (1) which is installed at the end of a conveyor (2) such as, for example, an endless-belt-type conveyor (3), of which the top strand, the only one visible in said figure, supports and carries objects of the bottle (4) kind, which bottles (4) progress along the various lanes (1) in the direction depicted by the arrow (5).

Figure 1:
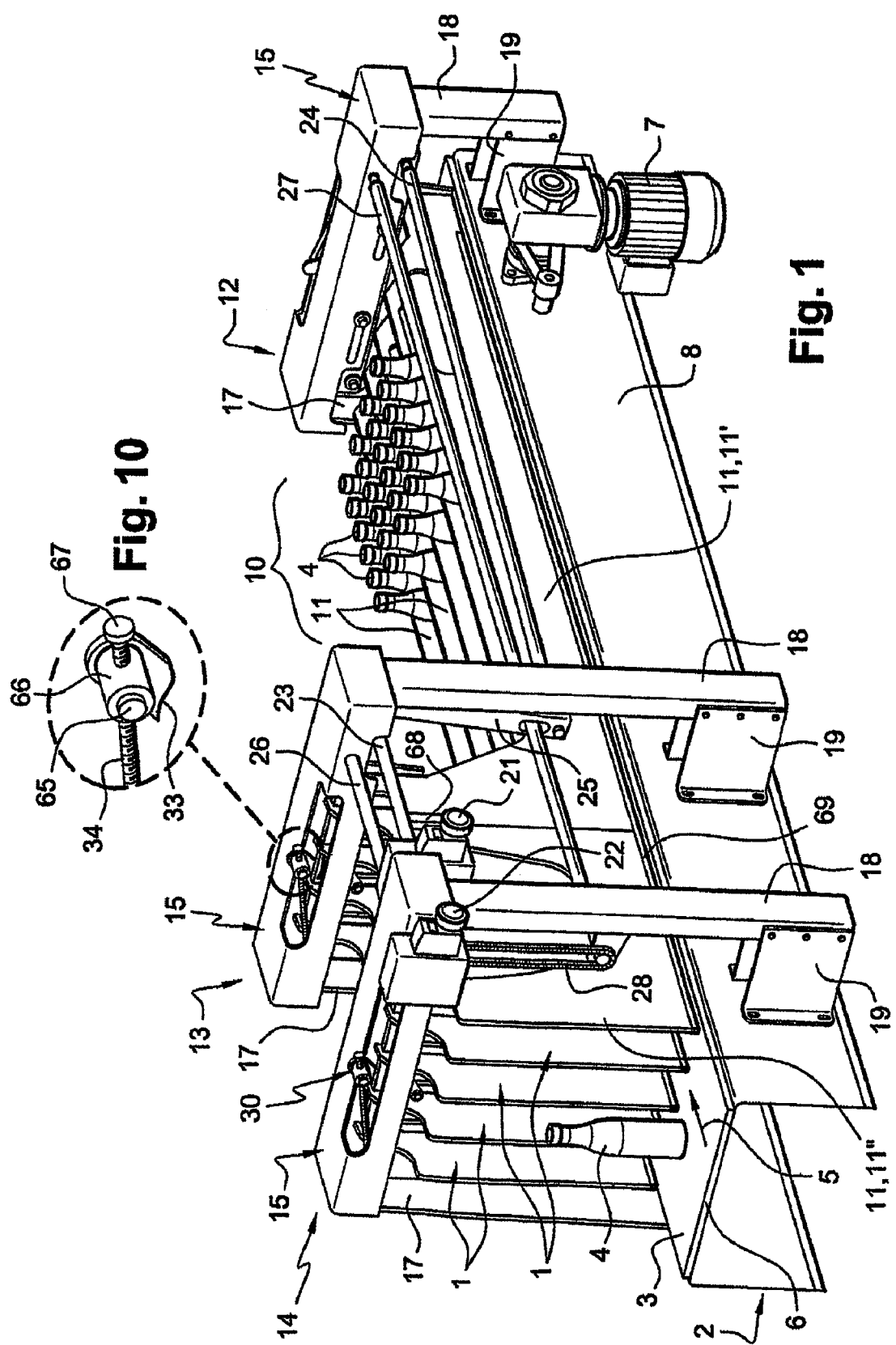
FIG. 1 is a perspective view of a system of lanes according to the invention, viewed from the front.

The conveyor belt (3) slides over a sole (6) which forms part of the overall structure of the conveyor (2) and is driven in the conventional way using a gear motor unit (7) positioned at the downstream end of said conveyor (2), on one of the flanks (8) of the structure thereof.

This lanes system generally lies at a handover station (10) in an installation for boxing and/or palletizing bottles (4) for example. At this station (10), as depicted in FIGS. 1 and 2, the bottles (4) are organized in such a way as to be handed over to appropriate means, not depicted, of the gripper head type for example, which heads are associated with a handling or some other tool.

Figure 2:
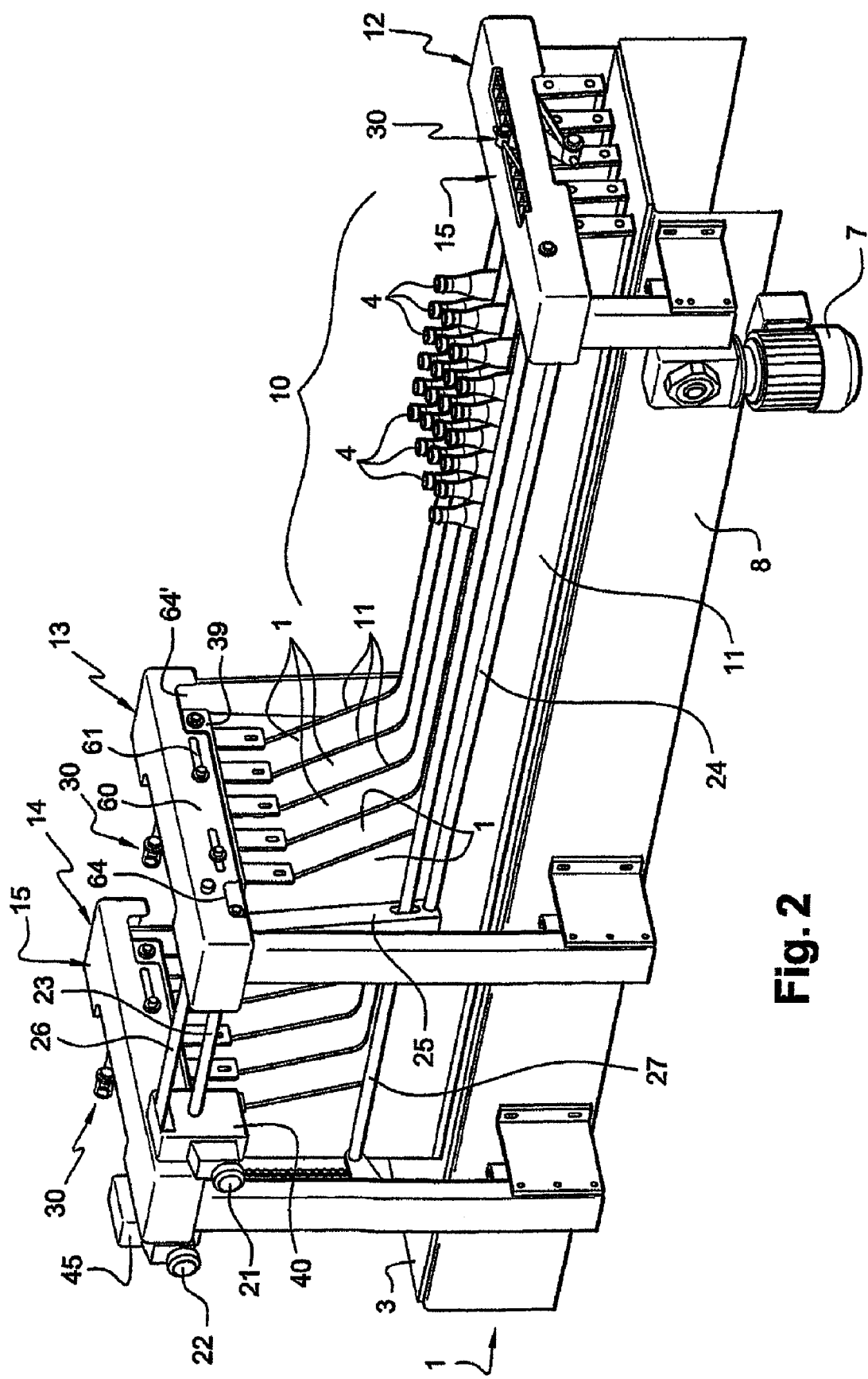
FIG. 2 depicts, again in perspective, the same system of lanes, but viewed from the rear.

In these FIGS. 1 and 2, the system of lanes (1) consists of walls (11) in the form of metal plates or plates made of some other materials, extending in a vertical plane above the conveyor belt (3) over the entire length of the handover station (10) and even a fair way upstream thereof.

These various walls (11) are supported by structures in the form of portal frames; in the example depicted, there are:

a portal frame (12) situated at the downstream end of said conveyor and of the handover station (10), —a portal frame (13) situated just upstream of said handover station (10), and—an additional portal frame (14) situated upstream of said portal frame (13), which portal frame (14) can be termed the entry portal frame.

These various portal frames (12, 13, 14) are configured to bear the walls (11) and to maintain their spacing; they additionally comprise, on the one hand, means for adjusting the width of each lane, that is to say means that allow the separation between the various walls (11) to be adjusted in order easily to adapt the installation to suit various formats of bottle (4) and, on the other hand, means for shifting all of said lane-forming walls (11) transversely with respect to the median vertical plane of the conveyor without altering the width between said lanes. This arrangement means that the lanes can be positioned relative to the gripper head, should the location thereof change.

Each portal frame (12, 13, 14) is made up:

of a box structure (15) containing the various means of guiding and moving the walls (11), which box structure extends transversely over the conveyor (2), of uprights (17) and (18) which extend vertically from the flanks (8) of the structure of the conveyor (2).

The height of the upstream portal frames (13, 14) is chosen according to the height of the bottles (4) which are on the conveyor (2); the height of the downstream portal frame (12) is different because this frame is simply positioned over the end of the walls (11) in order not to occupy any of the space at the handover station (10).

It will be noted from FIGS. 1 and 2 that the uprights (18) are laterally offset from the flank (8) of the conveyor and that they are secured to this flank at a mounting bracket (19). This lateral offset stems from the presence of the various means for controlling the walls (11), which control means will be detailed later on.

The walls (11) are supported and guided by a system of slides which is incorporated into the various box structures (15), which system of slides is detailed later on in conjunction with FIGS. 3, 5 and 7 to 9. The walls (11) are also secured to a movement mechanism actuated by a control member (21); this control member (21) allows the separation of said walls to be adjusted one relative to another and, as a result, allows the width of each lane to be adjusted.

The walls (11) are also under the influence of a second control member (22) which allows the transverse position of the lanes (1), that is to say their position with respect to the median longitudinal plane and axis of the conveyor, to be adjusted. This member (22) allows all of said lanes (1) to be shifted transversely without altering their width, so that lines of bottles or the like, the number of which can vary, switching from an even number to an odd number, can be guided as needed.

These two members (21) and (22) are grouped together at the portal frame (14); they also act on the portal frames (13), (12) via two systems of shafts which extend between said portal frames. Thus, in FIGS. 1 and 2, there can be seen:

a first system of shafts which consists of a shaft (23) situated between the upstream portal frames (13) and (14) and a shaft (24) connected to said shaft (23) by an endless chain which is positioned under a casing (25), which shaft (24) extends between the portal frames (12) and (13) over the entire length of the station (10), and a second system of shafts comprising a shaft (26) situated, as before, between the portal frames (13) and (14) and a shaft (27) connected to said shaft (26) by an endless chain (28), which shaft (27) extends between the upstream portal frame (14) and the downstream portal frame (12).

These various systems of shafts are positioned laterally so as not to impede operator access to the lanes. They will also be detailed later on in conjunction with FIG. 4 in particular.

Each box structure (15) of the portal frames (12, 13, 14) contains the various means of moving the walls (11) and, in particular, the system (30) that coordinates and adjusts the separation of these various walls relative to one another.

Figure 3:
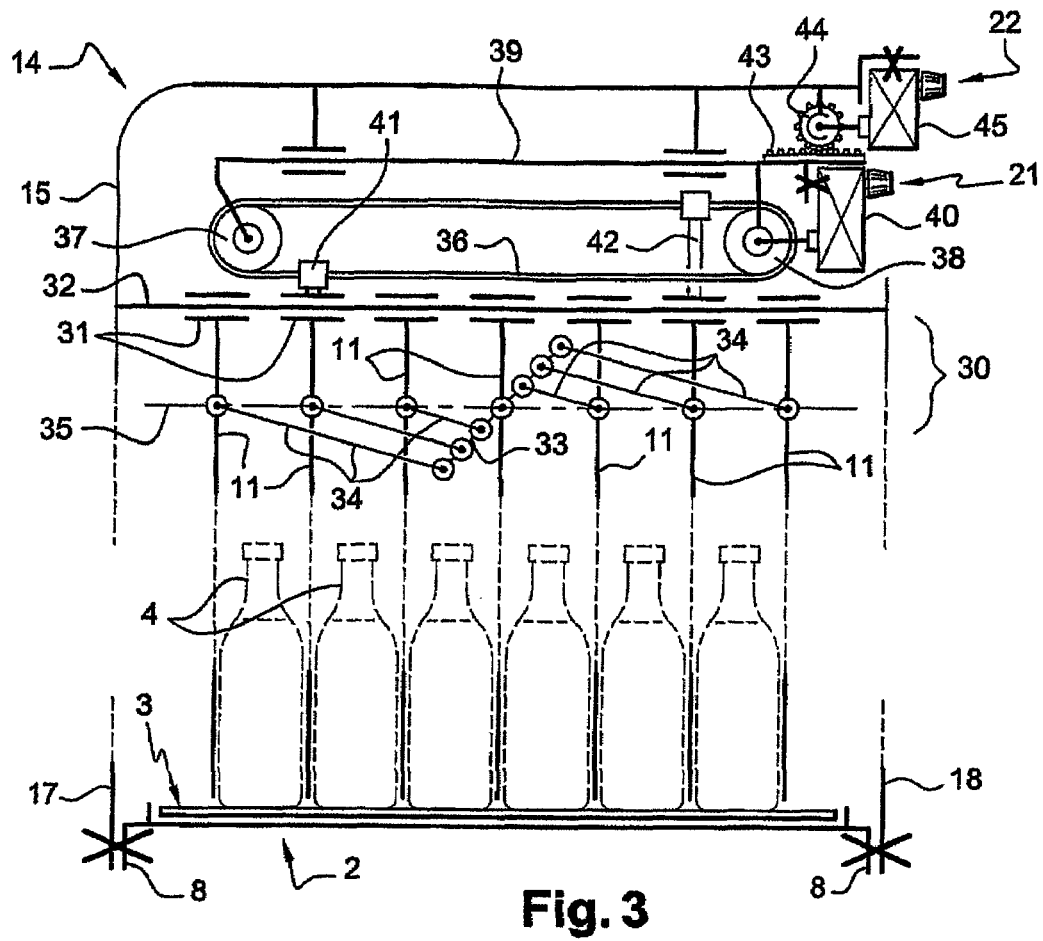
FIG. 3 depicts, in the form of a functional block diagram, the device for adjusting the lanes.

This coordinating system (30) together with the other control means have been depicted in the form of a functional block diagram in FIG. 3 to make everything easier to understand.

This FIG. 3 then schematically shows detail of the portal frame (14) which consists of the box structure (15) and of the uprights (17) and (18) secured to the flanks (8) of the conveyor (2). The belt (3) of this conveyor (2) supports bottles (4), which bottles are guided in lanes of which there are six in the example depicted in the figures.

The various lanes for guiding the bottles (4) are delimited by the walls (11) which are associated with a system of slides to allow them to move transversely over the belt (3) of the conveyor.

These walls (11) comprise, at their upper part and at each portal frame (12), (13), (14), a guide member in the form of a slider (31) which collaborates with a slide (32), which slide is secured to the box structure (15).

All the walls (11) are connected to the aforementioned coordinating system (30), which system comprises:

a lever (33) which is articulated to one of the walls (11) and, in particular, to the central wall, and—link rods (34) which connect this lever (33) to the other walls (11) positioned on each side of said central wall.

The various link rods (34) are mutually parallel and with the lever (33) form the two sides of homothetic triangular shapes that allow the various walls (11) to be adjusted simultaneously with the same separation.

The third side of these triangles consists of the line (35) which is parallel to the slide (32), which line passes through the axis of articulation of the lever (33) and through the axes of articulation of the link rods (34), which axes lie on the corresponding walls (11).

The various link rods (34) are positioned in one and the same plane and this plane is vertical, perpendicular to the longitudinal axis of the conveyor. This arrangement of the link rods (34) allows the space above the walls (11) to be left clear so that interventions can thus be made if need be on the bottles passing along the lanes, standing them up or removing them if necessary.

The width of the lanes is adjusted to suit the format of the bottles (4) using a drive system that drives the walls (11) and which can be seen, in FIG. 3, positioned above the slide (32).

This drive system comprises an endless belt or chain (36) which is stretched between two wheels (37, 38), which wheels (37, 38) are mounted on a carriage-like support (39) and one of said wheels, the wheel (38), is actuated through the control member (21).

This control member (21), in the form of a knob, is positioned on a housing (40) secured to the carriage (39) and able to move therewith, which housing (40) comprises appropriate means for transmitting the movement to the wheel (38).

The top strand and the bottom strand of the endless belt or chain (36) are each connected to one of the walls (11) by means of respective arms (41, 42), which arms are, for example, connected to the penultimate side walls (11) that act as master walls.

Thus, setting the wheel (38) in motion via the control member (21) and the chain (36) causes the arms (41) and (42) and the master walls (11) to move further apart or closer together as the case may be and, via the link rods (34) and the lever (33), causes all the other walls (11) which are walls known as driven walls to move further apart or closer together in exactly the same way.

The carriage (39) is guided in the box structure (15) by means of another slide system positioned transversely to the conveyor (2), which system will be detailed later on in conjunction with FIGS. 6 and 7.

This carriage (39) is moved by a control member (22) which allows it to be shifted transversely and which, as a result, allows all the walls (11) to be shifted as one, this being by means of the chain (36), of the arms (41) and (42), of the link rods (34) and of the lever (33). The entire mechanism for adjusting the width of the walls (11) shifts with the carriage (39).

The carriage (39) comprises, for example, a rack (43) which collaborates with a toothed wheel (44), which toothed wheel (44) is turned by the control member (22). This control member (22), the operation of which is manual or motorized like the member (21), actuates the toothed wheel (44) through an appropriate mechanism, for example reduction gearing which is positioned in a housing (45) which housing (45) is secured to the box structure (15).

Figure 6:
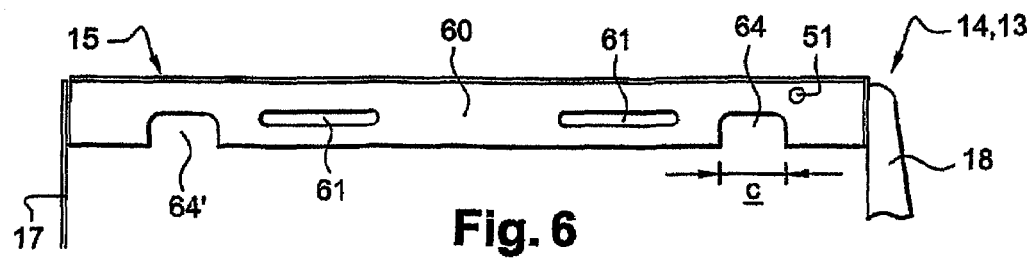
FIG. 6 is a view of one rim of the box structure of the entry portal frame, and in particular, of the downstream rim.

The travel C of the carriage (39), illustrated in FIG. 6, is designed to alter the position of the lanes with respect to the median axis of the conveyor or rather of its conveyor belt (3); this travel C is chosen to allow:

either the central wall (11), or the median plane of one of the two lanes (1) positioned on each side of said central wall (11) to be aligned with said axis.

This travel C is of the order of half the maximum width of the lanes.

The movement of the various walls (11) under the effect of the control member (21), and the overall transverse shifting of these various walls, is transmitted to the other systems (30) positioned in the box structures (15) of the other portal frames via the systems of shafts mentioned earlier in conjunction with FIGS. 1 and 2.

Figure 4:
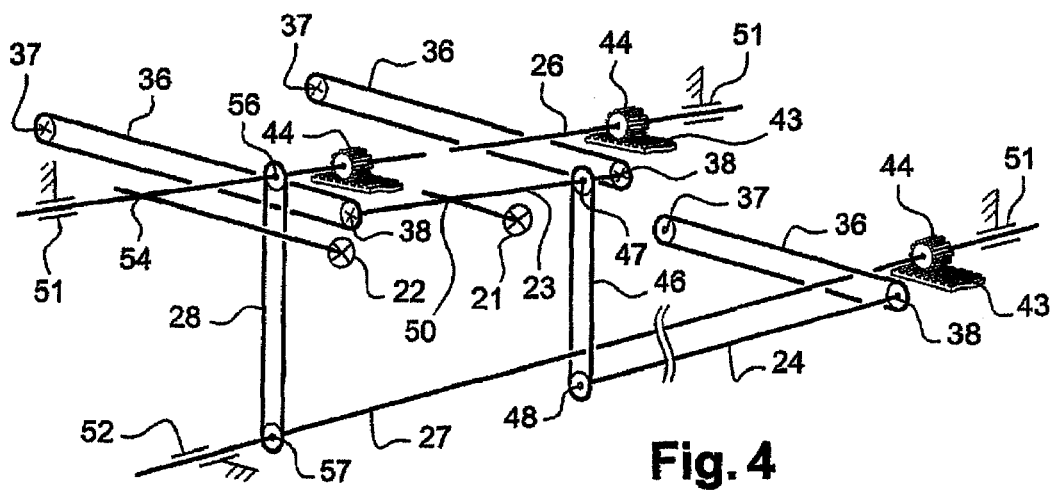
FIG. 4 illustrates, again in the form of a functional block diagram, the two systems of shafts used, on the one hand, to adjust the width of the lanes and, on the other hand, to shift all of said lanes transversely.

These systems of shafts are detailed in FIG. 4 in the form of a functional block diagram.

First of all there is the drive system for driving the walls (11) for moving them further apart or closer together simultaneously as the case may be; this drive system consists of the endless chain (36) stretched between the pairs of wheels (37), (38).

The wheels (38) positioned in the portal frames (13) and (14) are both mounted on the same shaft (23) which is the driving shaft; the wheel (38) positioned at the downstream portal frame (12) is mounted on the shaft (24) which shaft (24) is driven by an endless chain (46) stretched between a wheel (47) mounted on said shaft (23) and a wheel (48) mounted on said shaft (24).

The shaft (23) is turned by the control member (21) which is, for example, associated with a device of the angle transmission type (50).

The shafts (23) and (24) are guided in bearings which are secured to the carriages (39); they move at the same time as the various carriages (39) that bear the pairs of wheels (37, 38).

As mentioned earlier, in FIGS. 1 and 2, the chain (46) is arranged in a casing (25) which casing is guided, near its bottom, directly by the shaft (27) of the other system of shafts.

Because it moves under the effect of the movement of the carriage (39) and the fact that it is articulated to the shaft (27), the shaft (24) may, at each of its ends, have ball-joint connections with the wheel (38) for the chain (36) and with the wheel (48) for the chain (46) that drives it.

Extensions of the shafts (23) or (24) are possible for controlling other movement mechanisms which collaborate with upstream extensions of the walls (11), although such extensions have not been depicted.

The system of shafts that allows an overall translational movement of the lanes consists of several shafts guided in the structure of the various portal frames (12), (13), (14). Thus, the toothed wheels (44) of the upstream portal frames (13) and (14) are mounted on one and the same shaft (26) which is guided in bearings (51) secured to the box structure (15) of each of said portal frames (13), (14).

The toothed wheel (44) of the downstream portal frame (12) is driven by a shaft (27) which is guided, on the one hand, in a bearing (51) situated on the box structure (15) of said downstream portal frame (12) and, on the other hand, in a bearing (52) situated on the upright (18) of the portal frame (14).

Each wheel (44) collaborates with a rack (43) belonging to the carriage (39) which bears the system for driving the walls (11) and, in particular, the wheels (37) and (38) of the endless chain (36) by means of which the width of said lanes is adjusted.

The shaft (26) is driven by the movement member (22) which is associated, for example, with an angle transmission (54).

The connection between the driving shaft (26) and the driven shaft (27) is achieved by means of the endless chain (28) which chain is stretched between the wheels (56) and (57) which are mounted on said shafts (26) and (27) respectively.

Once again, extensions of the shafts are possible for controlling the overall translational movement of upstream extensions of the lanes (1) without changing their spacing set-up in any way.

FIGS. 5 to 9 illustrate in greater detail the embodiment of the various mechanisms which are incorporated into each of the box structures (15), in the knowledge that the downstream box structure (12) is appreciably different because it is the mirror image of the box structures (13, 14) situated upstream.

Figure 5:
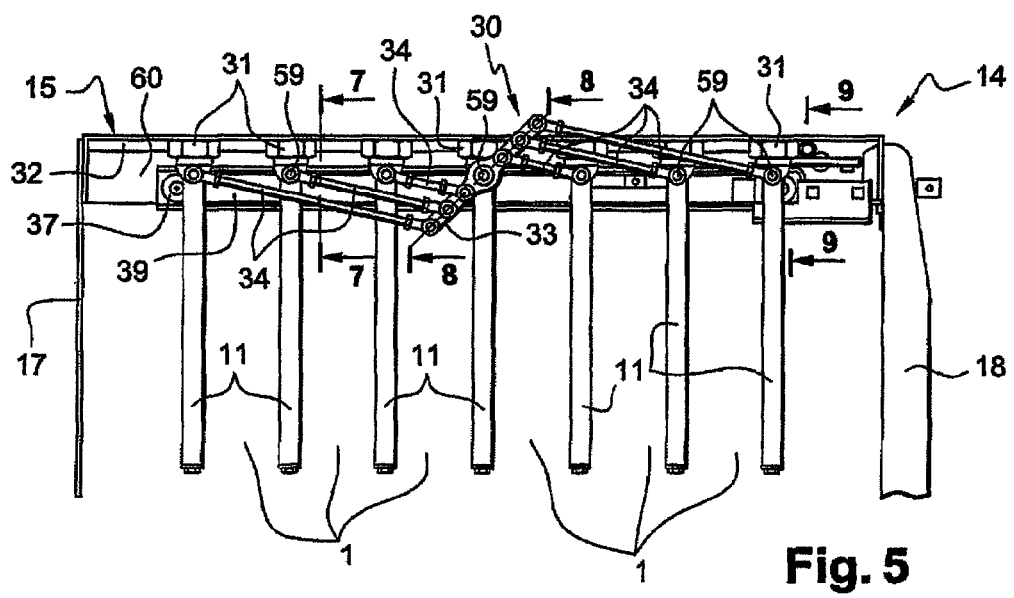
FIG. 5 shows, viewed from the front, one embodiment of the device for adjusting the lanes and, in particular, of the device housed in the entry box structure.

As depicted in FIG. 5, the slide (32) that guides the walls (11) is situated under the top surface of the box structure (15). The upper part of each wall (11) comprises a slider (31) the lower end of which is equipped with a pivot pin (59) for articulating the corresponding link rod (34) or the lever (33); these various pivot pins (59) are parallel to the longitudinal axis of the conveyor and lie substantially at the same level as the top strand of the endless chain (36), which chain is stretched between the two wheels (37) and (38), and these wheels (37) and (38) are mounted on the carriage (39).

The carriage (39) is in the form of a U-section piece and is guided on the vertical rim (60) of the box structure (15) by means of slots (61) visible in FIG. 6.

Figures 7, 8, 9:
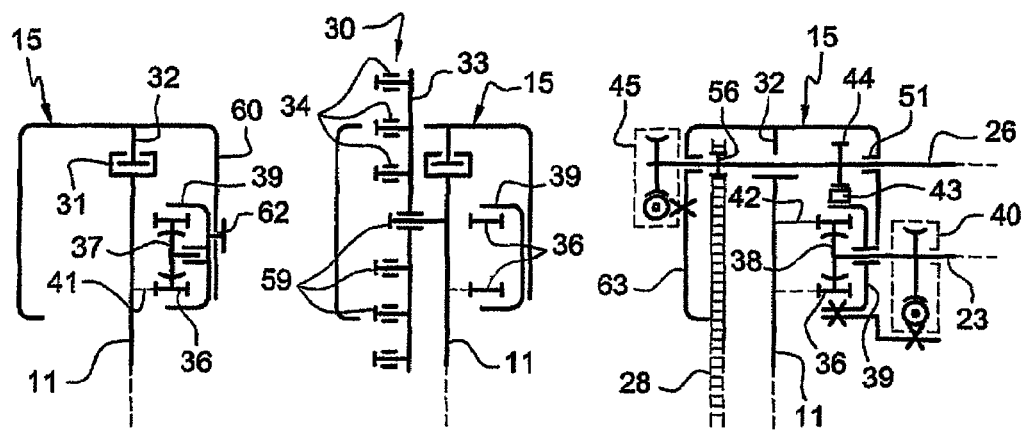
FIG. 7 is an enlarged section on 7-7 of FIG. 5.
FIG. 8 is an enlarged section on 8-8 of FIG. 5.
FIG. 9 is also an enlarged section, on 9-9 of FIG. 5.

FIG. 7 is an enlarged cross section of FIG. 5 in the form of a functional block diagram; it shows the box structure (15) with the carriage (39) which is supported and guided by the vertical rim (60) of the box structure (15) by means of sliders (62); these sliders (62) are guided in each corresponding slot (61) visible in FIG. 6.

This carriage (39) is shown with the wheel (37) used to guide the endless chain (36); the bottom strand of this chain (36) drives one of the walls (11) via the arm (41).

Also in FIG. 7 can be seen the slide (32) which is secured to the top surface of the box structure (15) and the slider (31) which is positioned at the upper end of the wall (11).

FIG. 8 is a section through the box structure (15) at the pivot pin (59) of the lever (33); this pin (59) is secured to the lower end of the slider (31) and lies level with the central wall (11).

It may be remarked that the entire coordinating system, that is to say the lever (33) and the link rods (34), is situated in the upper part of the walls (11) so as not to occupy too much of the space under the portal frame and run the risk of impeding the flow of the bottles.

The amount of adjustment of the width of the lanes may range from 60 to 105 mm for example.

FIG. 9 is a section through the box structure (15) passing, on the one hand, through the shaft (23) of the wheel (38) which collaborates with the chain (36) and, on the other hand, through the shaft (26) of the toothed wheel (44) which collaborates with the rack (43).

This rack (43) is secured to the carriage (39); it is in mesh with the toothed wheel (44) and is driven by the shaft (26) which shaft (26) is turned from the housing (45) and also, via the endless chain (28), drives the shaft (27) as depicted in FIGS. 1, 2 and 4.

It may be pointed out that the endless chain (28) is driven by means of a wheel (56) which is situated in the box structure (15) between the frontal rim (63) thereof and the slide (32).

Under the effect of the toothed wheel (44) and of its rack (43), the carriage (39) moves transversely in the box structure (15) driving with it the housing (40) of the control member (21) and the shaft (23).

FIG. 6 shows the notches (64, 64') made in the vertical rim (60) of the box structure (15), which notches (64, 64') allow the shaft (23) to shift transversely at the same time as the carriage (39). The second notch (64') visible on the left side of the rim (60) is a special arrangement which, depending on the set-up, may allow the passage of the end of the pivot pin for articulating the wheel (37) around which the endless chain (36) used to move the two master walls (11) is wrapped.

Visible again in this FIG. 6, above the notch (64) is the bearing (51) of the shaft (26) that controls the transverse movement of the carriage (39).

FIG. 2 shows, at the portal frames (13) and (14), on the vertical rim (60) of the box structure (15), the slots (61) which serve to guide the carriage (39) and the notches (64), (63') which respectively permit the passage of the shaft (23) and that of the axle of the wheel (37).

Also visible is the end of the shaft (26) which shaft (26), in the configuration depicted in FIG. 2, runs through a slot made in the housing (40).

FIG. 10 depicts details of the attachment of a link rod (34) to the lever (33). For certain, large-sized, types of bottle, or for changes to the number of working lanes, it is actually advantageous to be able to retract one or more of the side walls (11) and thus avoid any interference with either one of the uprights (17), (18) of the various portal frames.

To do that, the corresponding link rod (34) is secured to the lever (33) by means of an assembly capable of sliding. The lever (33) at its end comprises a mechanism with a push-button (65) which collaborates with notches formed on the end of the link rod (34). This push-button (65) allows said link rod (34) to be unfastened from the lever (33) and, in particular, from its pivot pin (66) and to be positioned in a way suited to the situation. The end of the link rod (34) has an end stop (67) which makes it possible easily to revert to the initial setting.

As depicted in FIG. 1, each wall (11) consists of two portions:

a downstream portion (11') positioned level with the handover station, and—an upstream portion (11") hinged to said downstream portion (11') so as to form, with the adjacent upstream portion or portions (11"), a kind of mouth or funnel.

The articulation between the two portions (11') and (11") is formed between the two portal frames (13) and (14), about an axis which is perpendicular to the plane of travel of the bottles (4), that is to say to the conveyor belt (3).

This articulation consists of a hinge (68) positioned at the upper part of the walls (11).

The lower part of the walls (11) may comprise strip-like blades (69) which act as guides for the bottles (4) in a region away from the label; the blades (69) also serve to reinforce said walls.

The ends of the upstream portions (11') are handled using the movement mechanisms described hereinabove. However, the mechanism for adjusting the separation of the upstream walls is slightly out of phase with respect to the other mechanisms, that is to say that the upstream entry to the lanes (1) is wider so as to form a real mouth.

This shift in phase is obtained by a different set-up of the arms (41) and (42) on the endless chain (36) of the upstream mechanism housed in the portal frame (14). Thus, for example, for lanes (1) 80 mm wide at the handover station (10), the width at the mouth of said lanes will be of the order of 90 mm.

The invention claimed is:

1. A device for adjusting lanes for guiding objects of the bottle type on a conveyor comprising a station, which device comprises a mechanism for moving walls which delimit said various lanes, which mechanism consists of a coordinated drive system which acts on said walls to adjust the width of said lanes simultaneously, which walls are guided on transverse slides which are secured to bearing structures positioned over said conveyor, the device comprising means for shifting said lanes transversely with respect to a median longitudinal axis of the conveyor, which shifting means consist, at each bearing structure, of a carriage-like support which is inserted between said bearing structure and said coordinated drive system for driving said walls, which carriage can move transversely under the effect of moving means and is guided by a slide system formed at said bearing structures in order to shift all of said lanes transversely without modifying the width of said lanes.

2. The device for adjusting lanes according to claim 1, comprising a movement mechanism for moving said various carriages which are positioned in said bearing structures, which movement mechanism comprises connecting means, in the form of shafts, connecting said carriages together so that a transverse position of all said lanes can be adjusted in a centralized manner with respect to the longitudinal median axis of the conveyor.

3. The device for adjusting lanes according to claim 2, wherein said movement mechanism for moving each said carriage consists of a rack positioned on said carriage and of a pinion driven by a control member, which control member acts on each said carriage via a system of shafts which shafts are positioned in such a way that said shafts do not impede access to said lanes (1).

4. The device for adjusting lanes according to claim 1, wherein said drive system comprises an endless belt or chain stretched between two wrap-around wheels, which are mounted on said carriage, which belt or chain is driven by driving means positioned directly on said carriage and the two strands of said belt or chain are parallel to said slide system that guides said walls, which strands of said belt or chain are each secured to one of said walls, which walls, which are driven by said belt or chain and termed master walls, drive all other walls by means of a system for coordinating the separation between said other walls.

5. The device for adjusting lanes according to claim 4, wherein said system for coordinating the separation of said various walls comprises:
    a lever articulated to a first one of said walls, and
    mutually parallel link rods inserted between said lever and each of said walls but said first wall, said link rods forming, with said lever, two of the sides of homothetic triangular shapes and are positioned in one plane which is vertical and perpendicular to the longitudinal median axis of the conveyor.

6. The device for adjusting lanes according to claim 1, wherein each said bearing structure comprises a box structure to house all mechanisms for guiding and moving said walls, which box structure is associated with uprights positioned laterally on the conveyor and forming, with said uprights, a portal frame situated over the conveyor, a first and a second portal frames being positioned on each side of the station and a third portal frame is positioned upstream of said second portal frame at an entrance to said lanes.

7. Device for adjusting lanes according to claim 6, wherein each said carriage is guided along a rim of said box structure of said corresponding bearing structure, the guidance of said carriage being by way of horizontal slots formed in said rim and of sliders secured to said carriage.

8. The device for adjusting lanes according to claim 6, including an adjusting mechanism comprising a first and a second systems of shafts:
    said first system of shafts consisting of shafts (for moving said carriages, and
    said second of shafts for moving said walls,
which systems of shafts each respectively comprises a master shaft (which extends between said second and third portal frames and a driven shaft, connected to said corresponding master shaft by a respective chain of the endless type, a first driven shaft extending from said second portal frame to said first and downstream portal frame and a first chain, which is arranged between a first master shaft and said first driven shaft running in a casing which is guided by a second driven shaft, which second driven shaft extends from said third and upstream portal frame as far as said first and downstream portal frame, said master and driven shafts being in a position that does not impede operator access to said lanes.

9. The device for adjusting lanes according to claim 1, wherein each wall consists of two portions hinged together; and of which one is
    a downstream portion positioned level with said station, and the other is an upstream portion (hinged to said downstream portion about a vertical axis so as to form, with at least one adjacent portion, a mouth or funnel, the upstream portions being handled, at their upstream end, by a drive system for driving upstream portions which is out of phase with other drive systems for driving said downstream portions through having been set up differently from the outset so that a wider spacing is applied to an entrance to said upstream portions.

10. The device for adjusting lanes according to claim 5, comprising means for quickly altering the position of one side wall and retracting it, which means are positioned level with an end of the corresponding link rod and, on said lever, which lever comprises a push-button which engages with notches formed on said corresponding link rod, which further comprises an end stop that makes it possible easily to revert to the initial set-up.

* * * * *